US011823014B2

(12) United States Patent
Kumar et al.

(10) Patent No.: US 11,823,014 B2
(45) Date of Patent: Nov. 21, 2023

(54) MACHINE LEARNING BASED DATABASE ANOMALY PREDICTION

(71) Applicant: SAP SE, Walldorf (DE)

(72) Inventors: Rajendra Kumar, Bangalore (IN); Heinz Wolf, Weingarten (DE); Lohit Kumar A. P, Bangalore (IN); Venkatesh R, Bangalore (IN)

(73) Assignee: SAP SE, Walldorf (DE)

( * ) Notice: Subject to any disclaimer, the term of this patent is extended or adjusted under 35 U.S.C. 154(b) by 1260 days.

(21) Appl. No.: 16/198,519

(22) Filed: Nov. 21, 2018

(65) Prior Publication Data

US 2020/0160211 A1    May 21, 2020

(51) Int. Cl.
  *G06N 20/00*    (2019.01)
  *G06N 3/04*    (2023.01)
  *G06N 3/08*    (2023.01)
  *G06F 16/23*    (2019.01)
  *G06N 3/044*    (2023.01)
  *G06F 16/25*    (2019.01)

(52) U.S. Cl.
  CPC ......... *G06N 20/00* (2019.01); *G06F 16/2365* (2019.01); *G06N 3/044* (2023.01); *G06N 3/08* (2013.01); *G06F 16/252* (2019.01)

(58) Field of Classification Search
  CPC ......... G06N 20/00; G06N 3/0445; G06N 3/08
  See application file for complete search history.

(56) References Cited

U.S. PATENT DOCUMENTS

| | | | |
|---|---|---|---|
| 8,798,969 | B2 | 8/2014 | Heidasch |
| 9,069,737 | B1 | 6/2015 | Kimotho et al. |
| 9,411,817 | B2 | 8/2016 | Stokely |
| 9,495,115 | B2 | 11/2016 | Schreiber et al. |
| 9,612,897 | B1 | 4/2017 | Bernico et al. |
| 11,016,824 | B1* | 5/2021 | Wells .................. G06F 11/3075 |
| 11,210,133 | B1* | 12/2021 | Barker, Jr. ............ G06F 9/4862 |
| 2007/0136402 | A1 | 6/2007 | Grose et al. |
| 2016/0217022 | A1* | 7/2016 | Velipasaoglu ...... G06F 11/0709 |
| 2018/0096243 | A1* | 4/2018 | Patil ..................... G06N 3/0454 |
| 2018/0307734 | A1* | 10/2018 | Bingham ................ G06F 16/22 |

(Continued)

OTHER PUBLICATIONS

Vinayakumar et al., "Long Short-Term Memory based Operation Log Anomaly Detection", 2017 (Year: 2017).*

(Continued)

*Primary Examiner* — Selene A. Haedi
(74) *Attorney, Agent, or Firm* — Mintz Levin Cohn Ferris Glovsky and Popeo, P.C.

(57) ABSTRACT

A method for machine learning based database management is provided. The method may include training a machine learning model to detect an anomaly that is present and/or developing in a database system. The anomaly in the database system may be detected by at least processing, with a trained machine learning model, one or more performance metrics for the database system. In response to detecting the presence of the anomaly at the database system, one or more remedial actions may be determined for correcting and/or preventing the anomaly at the database system. The one or more remedial actions may further be sent to a database management system associated with the database system. Related systems and articles of manufacture are also provided.

20 Claims, 9 Drawing Sheets

(56) References Cited

U.S. PATENT DOCUMENTS

| | | | | |
|---|---|---|---|---|
| 2019/0324831 A1* | 10/2019 | Gu | .................. | G06F 11/0775 |
| 2019/0354836 A1* | 11/2019 | Shah | .................. | G06N 3/044 |
| 2019/0361784 A1* | 11/2019 | Savanur | ............. | G06F 11/3034 |
| 2020/0028862 A1* | 1/2020 | Lin | .................. | H04L 63/104 |
| 2021/0200616 A1* | 7/2021 | Xu | .................. | G06F 3/0617 |

OTHER PUBLICATIONS

Wu et al., "RAMSES: a fast memory fault simulator", 1999 (Year: 1999).*
Du et al. "DeepLog: Anomaly Detection and Diagnosis from System Logs through Deep Learning", 2017 (Year: 2017).*
Fomina et al., "Methods and Algorithms of Anomaly Searching in Collections of Time Series", 2016 (Year: 2016).*
Lu et al., "Detecting Anomaly in Big Data System Logs Using Convolutional Neural Network", Aug. 2018 (Year: 2018).*

\* cited by examiner

MACHINE LEARNING BASED DATABASE ANOMALY PREDICTION

TECHNICAL FIELD

The subject matter described herein relates generally to database processing and more specifically to the use of machine learning in predicting anomalies during the operation of a database.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for predicting anomalies during the operation of a database. In one aspect, there is provided a system. The system may include at least one data processor and at least one memory. The at least one memory may store instructions that result in operations when executed by the at least one data processor. The operations may include: training a machine learning model to predict an occurrence of an anomaly at a database system during an upcoming time interval; collecting and/or receiving, from the database system, a series of performance metrics, the series of performance metrics including values for at least one performance metric measured at two or more successive time intervals; and processing, with the trained machine learning model, the series of performance metrics to predict the occurrence of the anomaly at the database system during the upcoming time interval.

In some variations, one or more features disclosed herein including the following features may optionally be included in any feasible combination. The anomaly may include a memory outage at a random access memory of the database system.

In some variations, the at least one performance metric may include an average quantity of host resident memory, an average quantity of host memory used, a quantity of column store unloads (for in memory database systems supporting column oriented data storage), an average ping response time between distributed database services, a count of out of memory events (reported in database trace files), and/or an average size of host memory swap operations.

In some variations, the training of the machine learning model may include processing, with the machine learning model, training data. The training data may include a plurality of performance metrics that are known to correspond to the anomaly occurring at the database system during the upcoming time interval. The training data may include a time based series of sets of values. This means that a set of values is provided in equidistant time intervals within a given time frame.

In some variations, the machine learning model may be a long short-term memory neural network. The long short-term memory neural network may predict the occurrence of the anomaly at the database system during the upcoming time interval by at least detecting a sequence of values for the at least one performance metric that correspond to the anomaly occurring at the database system during the upcoming time interval. The long short-term memory neural network may be trained by at least adjusting one or more weights applied by the long short-term memory neural network. The one or more weights may be adjusted to at least minimize an error in an output of the long short-term memory neural network. The long short-term memory neural network may include at least one long short-term memory layer comprising a memory cell. The processing of the series of performance metrics may update a hidden state of memory cell. The long short-term memory neural network may include a first long short-term memory layer and a second long short-term memory layer. The second long short-term memory layer may further process an output from the first long short-term memory layer.

In another aspect, there is provided a method for predicting anomalies during the operation of a database. The method may include: training a machine learning model to predict an occurrence of an anomaly at a database system during an upcoming time interval; collecting and/or receiving, from the database system, a series of performance metrics, the series of performance metrics including values for at least one performance metric measured at two or more successive time intervals; and processing, with the trained machine learning model, the series of performance metrics to predict the occurrence of the anomaly at the database system during the upcoming time interval.

In some variations, one or more features disclosed herein including the following features may optionally be included in any feasible combination. The anomaly may include a memory outage at a random access memory of the database system.

In some variations, the at least one performance metric may include an average quantity of host resident memory, an average quantity of host memory used, a quantity of column store unloads, an average ping length, a count of out of memory events in index server trace file, and/or an average size of host swap.

In some variations, the training of the machine learning model may include processing, with the machine learning model, training data. The training data may include a plurality of performance metrics that are known to correspond to the anomaly occurring at the database system during the upcoming time interval. The training data may include a first set of values for a first time interval and a second set of values for a second time interval.

In some variations, the machine learning model may be a long short-term memory neural network. The long short-term memory neural network may predict the occurrence of the anomaly at the database system during the upcoming time interval by at least detecting a sequence of values for the at least one performance metric that correspond to the anomaly occurring at the database system during the upcoming time interval. The long short-term memory neural network may be trained by at least adjusting one or more weights applied by the long short-term memory neural network. The one or more weights may be adjusted to at least minimize an error in an output of the long short-term memory neural network. The long short-term memory neural network may include at least one long short-term memory layer comprising a memory cell. The processing of the series of performance metrics may update a hidden state of memory cell. The long short-term memory neural network may include a first long short-term memory layer and a second long short-term memory layer. The second long short-term memory layer may further process an output from the first long short-term memory layer.

In another aspect, there is provided a computer program product that includes a non-transitory computer readable storage medium. The non-transitory computer-readable storage medium may include program code that causes operations when executed by at least one data processor. The operations may include: training a machine learning model to predict an occurrence of an anomaly at a database system during an upcoming time interval; collecting and/or receiving, from the database system, a series of performance metrics, the series of performance metrics including values for at least one performance metric measured at two or more successive time intervals; and processing, with the trained machine learning model, the series of performance metrics to predict the occurrence of the anomaly at the database system during the upcoming time interval.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the prediction of anomalies in the operations of a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database system may encounter one or more anomalies during its operation. For example, the database system may encounter a memory outage when there is insufficient random access memory (RAM) to accommodate data required to perform an operation such as, for example, an aggregation, a calculation, and/or the like. Memory outages tend to be unpredictable. Thus, when a memory outage does occur at the database system, the result may be costly downtime and a severe compromise to the reliability of the database system. Accordingly, in some example embodiments, the database system may be coupled with an anomaly prediction engine configured to predict the occurrence of one or more anomalies at the database system during an upcoming time interval including, for example, a memory outage and/or the like.

In some example embodiments, the anomaly prediction engine may predict the occurrence of one or more anomalies at the database system during the upcoming time interval by at least processing, with a trained machine learning model, a series of one or more performance metrics associated with the database system. The series of one or more performance metrics may include any performance metric that may be indicative of an operational state of the database system including, for example, an average quantity of host resident memory, an average quantity of host memory used, a quantity of column store unloads, an average ping response time, a count of out of memory events in database trace file, an average size of host memory swap operations, and/or the like. Moreover, the series of one or more performance metrics may include, for example, at least one performance metric received and/or collected from the database system at successive time intervals including, for example, a first time interval, a second time interval, a third time interval, and/or the like. The machine learning model may be trained to identify a sequence of one or more performance metrics indicative of the occurrence of one or more anomalies such as, for example, a memory outage and/or the like, during the upcoming time interval.

Figure 1:
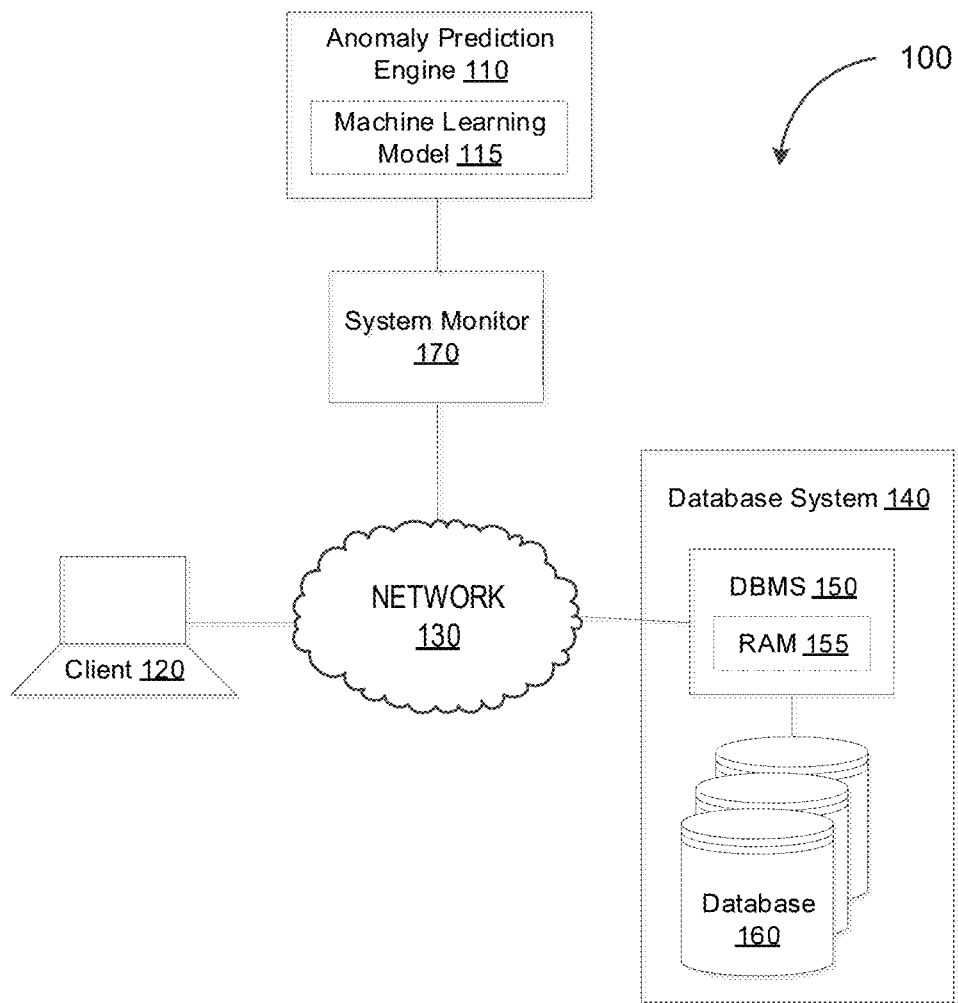
FIG. 1 depicts a system diagram illustrating a machine learning based anomaly prediction system, in accordance with some example embodiments.

FIG. 1 depicts a system diagram illustrating a machine learning based anomaly prediction system 100, in accordance with some example embodiments. Referring to FIG. 1, the machine learning based anomaly prediction system 100 may include an anomaly prediction engine 110, a client 120, a database system 140, and a system monitor 170. As shown in FIG. 1, the anomaly prediction engine 110, the client 120, the database system 140, and/or the system monitor 170 may be communicatively coupled via a network 130. It should be appreciated that the network 130 may be any wired and/or wireless network including, for example, a wide area network (WAN), a local area network (LAN), a virtual local area network (VLAN), a public land mobile network (PLMN), the Internet, and/or the like.

Referring again to FIG. 1, the database system 140 may include a database management system (DBMS) 150 and a database 160. The database 160 may be any type of database including, for example, an in-memory database, a relational database, a non-SQL (NoSQL) database, and/or the like. Meanwhile, the database management system 150 may be configured to respond to one or more query from the client 120 to access the database 150. The database management system 150 may respond to the queries from the client 120 by performing one or more database operations including, for example, aggregations, calculations, and/or the like. The performance of the one or more database operations may require the database management system 150 to load data from the database 160 to a random access memory (RAM) 155 at the database management system 150. An anomaly at the database system 140 may occur when the random access memory 155 is unable to accommodate the data being loaded from the database 160. Such a memory outage may cause a shutdown of the database system 140, thereby giving rise to costly downtime and compromising the reliability of the database system 140.

In some example embodiments, the anomaly prediction engine 110 may be configured to predict the occurrence of one or more anomalies at the database system 140 during an upcoming time interval including, for example, memory outages in which the random access memory 155 is no longer able to accommodate data being loaded form the database 160 to respond to one or more queries from the client 120. As shown in FIG. 1, the anomaly prediction engine 110 may be coupled with the system monitor 170, which may be configured to collect, from the database system 140, raw performance metrics. It should be appreciated that the database system 140 may be deployed across multiple hosts. As such, the system monitor system 170 may be further configured to separate raw performance metrics collected from different hosts and preprocess the raw performance metrics before sending, to the anomaly prediction engine 110, the preprocessed performance metrics.

The system monitor 170 may perform preprocessing that includes normalization of the raw performance metrics collected from the database system 140. For example, the normalization of the raw performance metrics may include determining an average value, a maximum value, a minimum value, and/or a sum value of at least some of the raw performance metrics. Alternatively and/or additionally, at least some of the raw performance metrics collected from the database system 140 may be normalized into relative values (e.g., percentages, ratios, and/or the like) to remove distortions imposed, for example, due to system size. Accordingly, instead of operating on raw performance metrics, the anomaly prediction engine 110 may operate on normalized performance metrics that correspond to one or more aggregate values and/or relative values determined based on the raw performance metrics.

In some example embodiments, the anomaly prediction engine 110 may predict the occurrence of one or more anomalies at the database system 140 based on one or more performance metrics received and/or collected from the database system 140. These one or more performance metrics may include any performance metric that may be indicative of an operational state of the database system 140 including, for example, an average quantity of host resident memory, an average quantity of host memory used, a quantity of column store unloads, an average ping response time, a count of out of memory events in database trace files, an average size of host memory swap operations, and/or the like. To further illustrate, Table 1 below enumerates examples of performance metrics that may be used by the anomaly prediction engine 110 to predict the occurrence of one or more anomalies at the database system 140 during the upcoming time interval. The concrete list of metrics depends on the detailed database architecture attributes (in memory, relational, non-SQL, column oriented storage, row oriented storage, distributed database, parallel database, etc.).

TABLE 1

| Metric ID | Metric Name | Metric Description |
|---|---|---|
| M1 | AVG_HOST_MEM_RES_PCT | Measures an average percentage of resident memory (e.g., physically allocated in random access memory (RAM)) in relation to a total quantity of physically available random access memory per host. |
| M2 | AVG_HOST_MEM_USED_PCT | Measures an average percentage of memory used by all database processes per database host in relation to a corresponding sum of all database service memory allocation limits running on that host. |
| M3 | Column Store Unloads - Host Specific | Quantity of column store table unloads triggered by memory shortage per database host. |
| M4 | AVG_PING_MS | Current ping time associated with ping requests from a nameserver to other services within a database system. Ping requests may be performed periodically (e.g., every 10 seconds and/or a different time interval) and the result of the ping requests may be measured in milliseconds (or a different unit of measurement). |
| M5 | Quantity of Out of Memory Events in Database Trace File | Quantity of database operations aborted within a to a demand overload at the main memory. |
| M6 | Average host memory swap operations in MB | Average amount of main memory swapped out on the database management system host(s) to external swap space by the operating system in order to free up main memory required to satisfy current memory requests from the database management system. |

In some example embodiments, the anomaly prediction engine 110 may predict the occurrence of the one or more anomalies at the database system 140 by at least processing, using a trained machine learning model 115, the one or more performance metrics received and/or collected from the database system 140. The anomaly prediction engine 110 may train the machine learning model 115 using training data that includes values for performance metrics that are known to correspond to the presence and/or absence of one or more anomalies (e.g., a memory outage and/or the like) occurring during an upcoming time interval. For example, the machine learning model 115 may be trained via one or more supervised and/or unsupervised learning techniques. Training the machine-learning model 115 may include optimizing the weights and/or biases applied by the machine-learning model in order to minimize an error in an output of the machine-learning model 115.

In some example embodiments, the machine learning model 115 may be trained to process one or more performance metrics that are received and/or collected from the database system 140 at successive time intervals. To further illustrate, Table 2 below depicts a series of six different performance metrics (e.g., M1, M2, M3, M4, M5, and M6) that have been received and/or collected from the database system 140 at six successive time intervals (e.g., T0, T1, T2, T3, T4, and T5). As shown in Table 2, at each of the time intervals T0, T1, T2, T3, T4, and T5, the anomaly prediction engine 110 may receive and/or collect, from the database system 140, a set of values for each of the six performance metrics M1, M2, M3, M4, M5, and M6.

TABLE 2

| Time Interval | M1 | M2 | M3 | M4 | M5 | M6 |
|---|---|---|---|---|---|---|
| T5 | $v_{1,5}$ | $v_{2,5}$ | $v_{3,5}$ | $v_{4,5}$ | $v_{5,5}$ | $v_{6,5}$ |
| T4 | $v_{1,4}$ | $v_{2,4}$ | $v_{3,4}$ | $v_{4,4}$ | $v_{5,4}$ | $v_{6,4}$ |
| T3 | $v_{1,3}$ | $v_{2,3}$ | $v_{3,3}$ | $v_{4,3}$ | $v_{5,3}$ | $v_{6,3}$ |
| T2 | $v_{1,2}$ | $v_{2,2}$ | $v_{3,2}$ | $v_{4,2}$ | $v_{5,2}$ | $v_{6,2}$ |
| T1 | $v_{1,1}$ | $v_{2,1}$ | $v_{3,1}$ | $v_{4,1}$ | $v_{5,1}$ | $v_{6,1}$ |
| T0 | $v_{1,0}$ | $v_{2,0}$ | $v_{3,0}$ | $v_{4,0}$ | $v_{5,0}$ | $v_{6,0}$ |

For example, at the first time interval T0, the anomaly prediction engine 110 may receive and/or collect, from the database system 140, a first set of values $S_1$ for the six performance metrics M1, M2, M3, M4, M5, and M6 that includes the values $v_{1,0}$, $v_{2,0}$, $v_{3,0}$, $v_{4,0}$, $v_{5,0}$, and $v_{6,0}$. At the second time interval T2, the anomaly prediction engine 110 may receive and/or collect from the database system 140, a second set of values $S_2$ for the six performance metrics M1, M2, M3, M4, M5, and M6 that includes the values $v_{1,1}$, $v_{2,1}$, $v_{3,1}$, $v_{4,1}$, $v_{5,1}$, and $v_{6,1}$. The anomaly prediction engine 110 may receive and/or collect additional sets of values from the database system 140 including, for example, $S_3$, $S_4$, $S_5$, and $S_6$ for the six performance metrics M1, M2, M3, M4, M5, and M6 during the subsequent time intervals T2, T3, T4, T5, and/or the like.

In some example embodiments, the machine learning model 115 may be trained to process the sets of values $S_1$, $S_2$, $S_3$, $S_4$, $S_5$, and $S_6$ for the six performance metrics M1, M2, M3, M4, M5, and M6 received during successive time intervals T0, T1, T2, T3, T4, T5, and/or the like, and detect a sequence of performance metrics indicative of the occurrence of an anomaly at the database system 140 during an upcoming time interval. For instance, upon processing the second set of value $S_2$, the third set of value $S_3$, and the fourth set of value $S_4$ received and/or collected from the database system 140 during the second time interval T1, the third time interval T2, and the fourth time interval T3, the machine learning model 115 may detect a sequence of performance metrics indicative of the occurrence of an anomaly at the database system 140 during an upcoming time interval such as, for example, within the next x quantity of time.

Figure 2A:
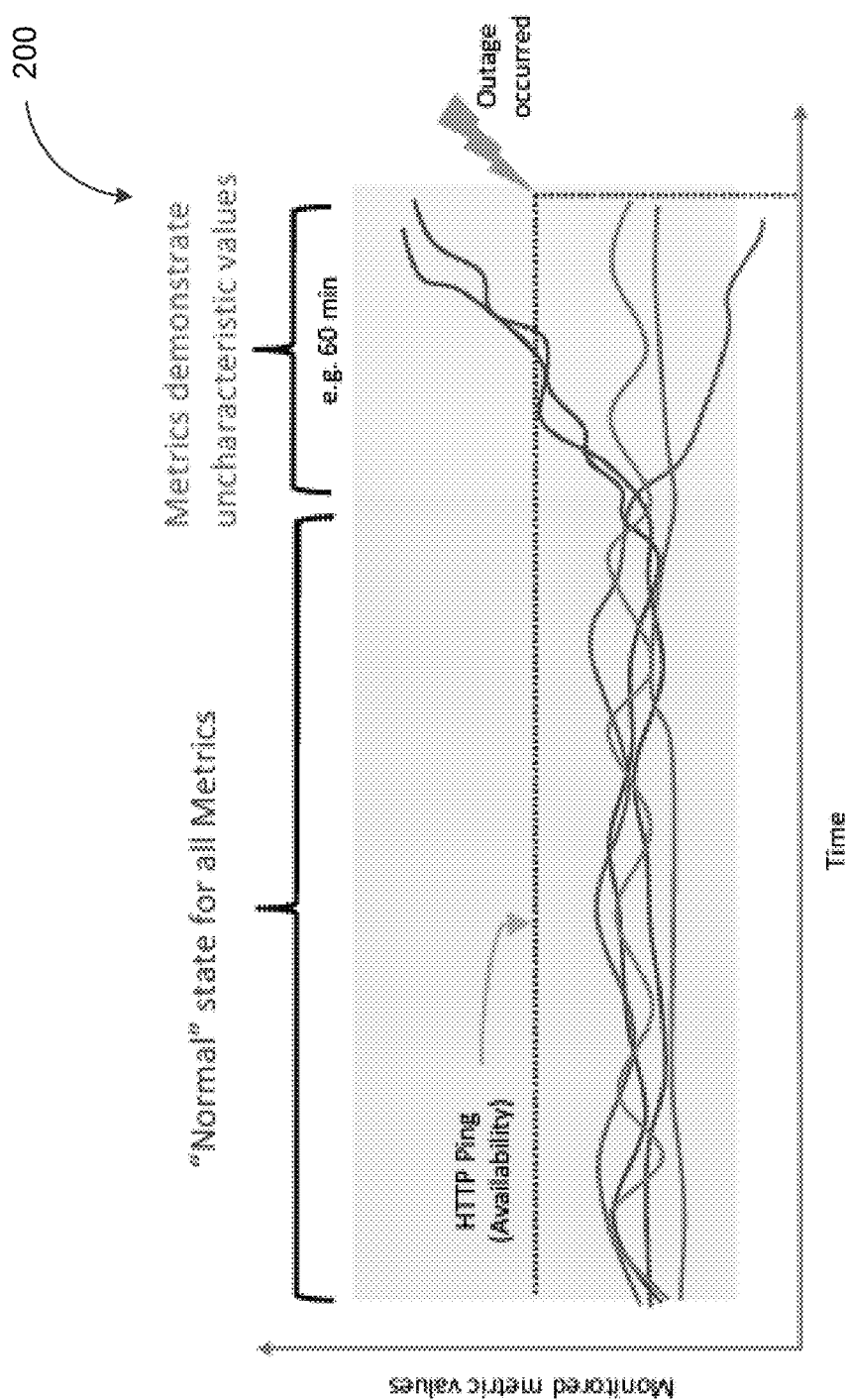
FIG. 2A depicts a graph illustrating performance metrics for predicting the occurrence of anomaly in a database system, in accordance with some example embodiments.

To further illustrate, FIG. 2A depicts a graph 200 illustrating performance metrics for predicting the occurrence of an anomaly in the database system 140, in accordance with some example embodiments. As shown in FIG. 2A, the anomaly prediction engine 110 may receive and/or collect, from the database system 140, a series of performance of metrics that may begin to exhibit uncharacteristic values an x quantity of time (e.g., 60 minutes or a different quantity of time) prior to the occurrence of an anomaly such as, for example, a memory outage.

In some example embodiments, the machine learning model 115 may be trained to detect a sequence of performance of metrics that is indicative of the occurrence of the anomaly. That is, the machine learning model 115 may be trained to recognize when the performance metrics received and/or collected from the database system 140 begin to exhibit uncharacteristic values an x quantity of time prior to the occurrence of the corresponding anomaly. In doing so, the machine-learning model 115 may be capable of predicting, an x quantity of time in advance, the occurrence of the anomaly at the database system 140.

Figure 2B:
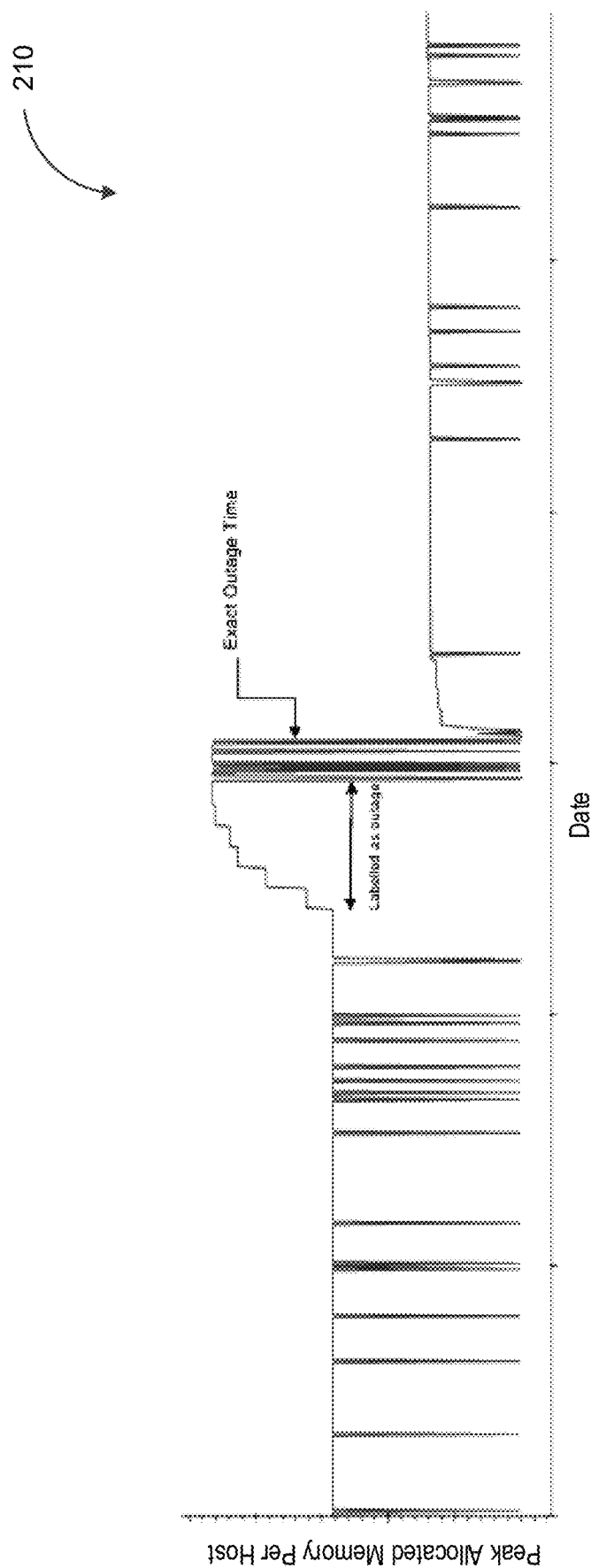
FIG. 2B depicts a graph illustrating an example of training data, in accordance with some example embodiments.
Figure 2C:
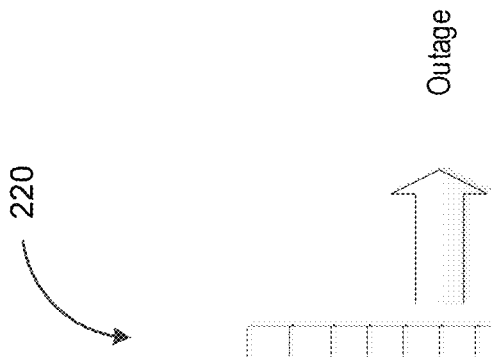
FIG. 2C depicts a table illustrating an example of training data, in accordance with some example embodiments.
Figure 2D:
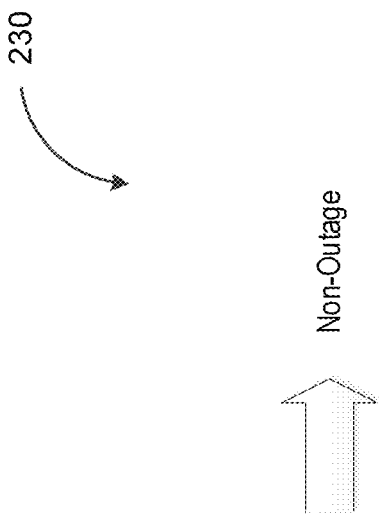
FIG. 2D depicts a table illustrating an example of training data, in accordance with some example embodiments.

FIGS. 2B-D depicts examples of training data that may be used to train the machine learning model 115. For example, FIG. 2B depicts a graph 210 illustrating an example of training data, in accordance with some example embodiments. At least a portion of the training data shown in the graph 210 may be labeled as being associated with an upcoming anomaly at the database system 140 such as, for example, a memory outage. Meanwhile, FIG. 2C depicts a table 220 illustrating an example of training data that has been labeled as being associated with an upcoming anomaly at the database system 140 such as, for example, a memory outage. Alternatively and/or additionally, FIG. 2D depicts a table 230 illustrating an example of training data that has been labeled as being associated with the database system 140 operating without any upcoming anomalies.

FIG. 2D depicts a table illustrating an example of training data, in accordance with some example embodiments In some example embodiments, the machine learning model 115 may be a recurrent neural network (RNN) including, for example, a long short-term memory (LSTM) neural network and/or the like. However, it should be appreciated that the machine learning model 115 may be any type of machine learning model including, for example, a regression model, an instance-based model, a regularization model, a decision tree, a random forest, a Bayesian model, a clustering model, an associative model, a deep learning model, a dimensionality reduction model, an ensemble model, and/or the like. A long short-term memory neural network may be capable of processing a series of performance metrics collected and/or received from the database system 140 and recognizing dependencies amongst the performance metrics that are collected and/or received across multiple successive time intervals. Recognizing these dependencies may enable the machine learning model 115 to detect when the machine learning model 115 has encountered a sequence of performance metrics that is indicative of the occurrence of an anomaly (e.g., a memory outage and/or the like) at the database system 140 during an upcoming time interval.

Figure 3A:
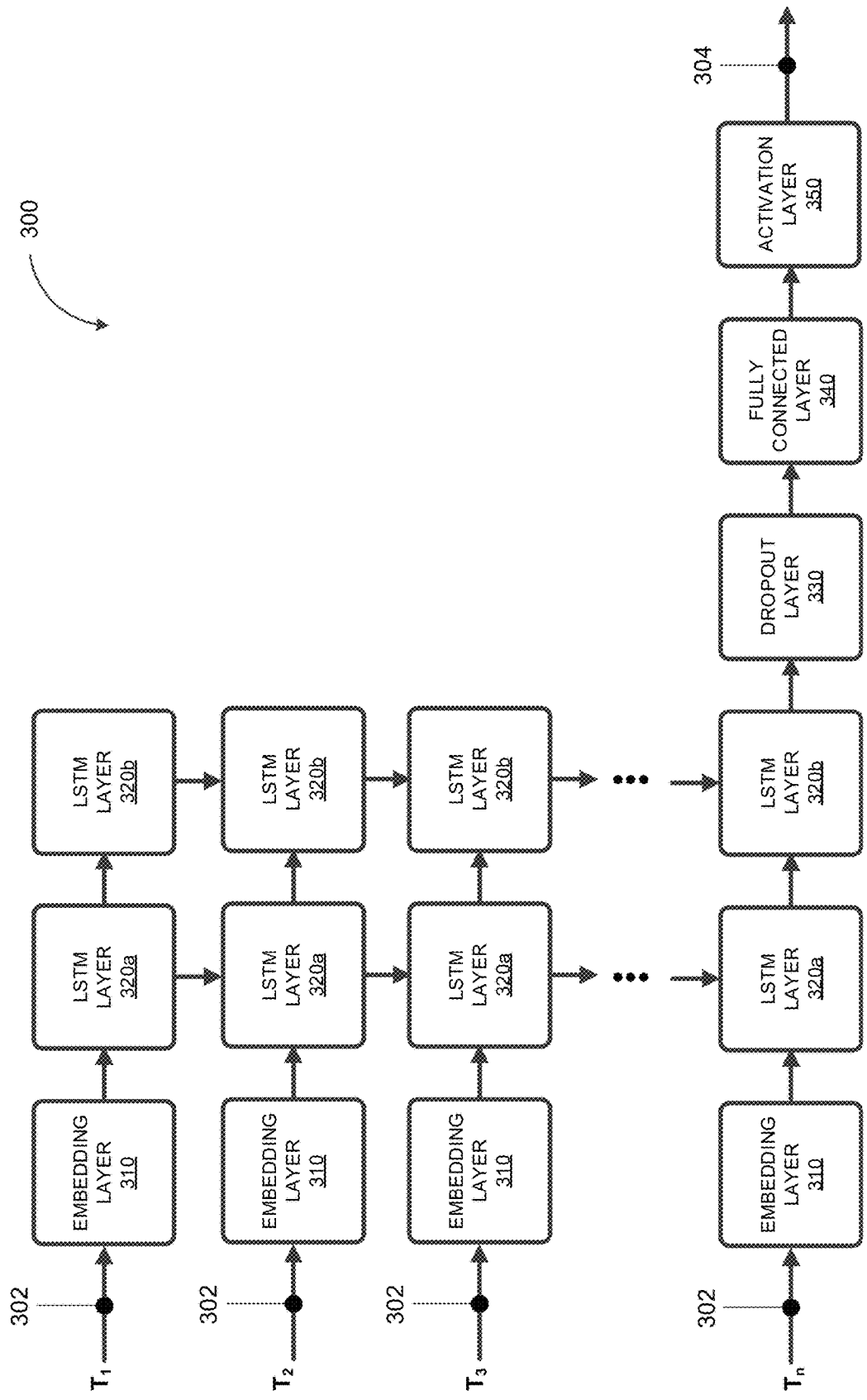
FIG. 3A depicts a long short-term memory neural network, in accordance with some example embodiments.

FIG. 3A depicts a long short-term memory neural network 300, in accordance with some example embodiments. The operations of the long short-term memory neural network 300 may be performed in separate stages that correspond to the individual layers. Referring to FIG. 3A, the long short-term memory neural network 300 may include an embedding layer 310, a first long short-term memory layer 320a, a second long short-term memory layer 320b, a dropout layer 330, a fully connected layer 340, and an activation layer 350. However, it should be appreciated that the long short-term memory neural network 300 may include different layers than show including, for example, a different quantity of long short-term memory layers.

One or more operations may be performed at each of the embedding layer 310, the first long short-term memory layer 320a, the second long short-term memory layer 320b, the dropout layer 330, the fully connected layer 340, and the activation layer 350 in order to process a series of performance metrics collected and/or received from the database system 140 and detect a sequence of performance metrics indicative of the occurrence of an anomaly at the database system 140 during an upcoming time interval.

In some example embodiments, the long short-term memory neural network 300 may receive, at an input 302, series of performance metrics and provide, at an output 304, a corresponding classification of the series of performance metrics, for example, as being indicative of normal and/or anomalous.

The embedding layer 310 may be configured to encode the series of performance of metrics collected and/or received from the database system 140. The series of performance metrics received and/or collected from the database system 140 may include one or more performance metrics indicative of the operational state of the database system 140 including, for example, an average quantity of host resident memory, an average quantity of host memory used, a quantity of column store unloads, an average ping length, a count of out of memory events in index server trace file, an average size of host swap, and/or the like. Moreover, the series of performance metrics may include performance metrics that are collected and/or received from the database system 140 at successive time intervals.

As shown in Table 2, the series of performance metrics may include individual sets of values for different performance metrics (e.g., M1, M2, M3, M4, M5, and M6) collected and/or received from the database system 140 at successive time intervals (e.g., T0, T1, T2, T3, T4, and T5). For example, the first set of values $S_1$ received and/or collected from the database system 140 during the first time interval T0, may include the values $v_{1.0}$, $v_{2.0}$, $v_{3.0}$, $v_{4.0}$, $v_{5.0}$, and $v_{6.0}$ while the second set of values $S_2$ received and/or collected from the database system 140 during the second time interval T1, may include the values $v_{1.1}$, $v_{2.1}$, $v_{3.1}$, $v_{4.1}$, $v_{5.1}$, and $v_{6.1}$. Accordingly, the embedding layer 310 may encode each set of values into a corresponding vector, thereby generating a sequence of vector representations ($v_1$, $v_2$, ... $v_n$) for the series of performance metrics collected and/or received from the database system 140. For instance, the embedding layer may generate a first vector $v_1=[v_{1.0}, v_{2.0}, v_{3.0}, v_{4.0}, v_{5.0}, v_{6.0}]$ for the first set of values $S_1$ received and/or collected from the database system 140 during the first time interval T0, and a second vector $v_2=[v_{1.1}, v_{2.1}, v_{3.1}, v_{4.1}, v_{5.1}, v_{6.1}]$ for the second set of values $S_2$ received and/or collected from the database system 140 during the first time interval T1.

In some example embodiments, the first long short-term memory layer 220a may be configured to process the sequence of vector representations ($v_1$, $v_2$, ... $v_n$) generated by the embedding layer 310 for the series of performance metrics collected and/or received from the database system 140. The first long short-term memory layer 220a may process the tokens sequentially. For example, the first long short-term memory layer 220a may process the sequence of n vectors ($v_1$, $v_2$, ... $v_n$) by at least processing the vectors one by one starting at the vector first $v_1$ corresponding to the first set of values $S_1$ of the performance metrics collected and/or received from the database system 140 at the first time interval T1, followed by the second vector $v_2$ corresponding to the second set of values $S_2$ of the performance metrics collected and/or received from the database system 140 at the second time interval T2, and ending at the n-th vector $v_n$ corresponding to the n-th set of values $S_n$ of performance metrics collected and/or received from the database system 140 at an n-th time interval Tn.

Information from previous sets of values processed by the first long short-term memory layer 320a may be selectively accumulated, retained, and/or passed onto subsequent processing stages when the first long short-term memory layer 320a processes subsequent sets of values. According to some example embodiments, information from previous sets of values processed by the first long short-term memory layer 320a may further be selectively passed onto subsequent long short-term memory layers including, for example, the second long short-term memory layer 320b. The second long short-term memory layer 320b may process information from the first long short-term memory layer 320a and may selectively accumulate, retain, and pass information onto subsequent processing stages when the second long short-term memory layer 320b processes additional information from the first long short-term memory layer 320a.

Because the first long short-term memory layer 320a and the second long short-term memory layer 320b may both have memory to retain at least some of the information that was processed by the first long short-term memory layer 320a and the second long short-term memory layer 320b, the first long short-term memory layer 320a and the second long short-term memory layer 320b may be trained to recognize interdependencies amongst the series of performance metrics collected and/or received from the database system 140. The interdependencies amongst the series of performance metrics may include a sequence of uncharacteristic values for one or more performance metrics indicating that an anomaly such as, for example, a memory outage, may occur at the database system 140 during an upcoming time interval. For example, the first long short-term memory layer 320a may retain one set of values while it continues to process one or more sets of values. When the first long short-term memory layer 320a subsequently encounters another set of value, the first long short-term memory layer 320a may be able to recognize an interdependency between the successive sets of values that corresponding to a sequence of uncharacteristic values for one or more performance metrics.

Although the long short-term memory neural network 300 is shown to include the first long short-term memory layer 320a and the second long short-term memory layer 320b, it should be appreciated that the long short-term memory neural network 300 may include a different quantity of long short-term memory layers. Where the long short-term memory neural network 300 includes one or more additional long short-term memory layers, each additional long short-term memory layer may be configured to further selectively process, accumulate, and/or pass on information received from previous long short-term memory layers.

Referring again to FIG. 3A, the dropout layer 330 may be configured to remove (e.g., drop out) at least some of the output from the second long short-term memory layer 320b. The operations of one or more preceding long short-term memory layers (e.g., the first long short-term memory layer 320a and/or the second long short-term memory layer 320b) may introduce sampling noise, which may cause overfitting at the subsequent fully connected layer 140. As such, the dropout layer 330 may prevent overfitting by omitting at least some of the outputs from the second long short-term memory layer 320*b* in accordance with a certain probability p. For instance, outputs from the second long short-term memory layer 320*b* may be dropped out a p proportion of the time and may be passed onto the fully connected layer 340 the remaining (1−p) proportion of the time.

In some example embodiments, the outputs from the dropout layer 330 may be passed onto the fully connected layer 340, which may be configured to perform one or more high level processing operations across the full set of output from the dropout layer 330. Meanwhile, the activation layer 350 may apply one or more activation functions to the output from the fully connected layer 340 to generate the output 304, which may be a classification of a sequence of performance metrics as being normal or anomalous. For example, the activation layer 350 may apply Softmax activation function depicted by Equation (1) below:

$$P(y=j|x) = \frac{e^{x^T w_j}}{\sum_{k=1}^{K} e^{x^T w_k}} \quad (1)$$

FIG. 3A further depicts a plurality of processing stages of long short-term memory neural network 300. As shown in FIG. 3A, the long short-term memory neural network 300 may receive, at the input 302, multiple sets of values (e.g., $S_1, S_2, \ldots, S_n$) for the performance metrics that are collected and/or received from the database system 140 at successive time intervals (e.g., $T_1, T_2, T_3, \ldots T_n$). As shown in FIG. 3A, the long short-term memory neural network 300 may be unfolded to show the successive stages of processing the n sets of values $S_1, S_2, \ldots, S_n$.

For example, the long short-term memory neural network 300 may receive the first set of values $S_1$ for performance metrics that are collected and/or received from the database system 140 at the first time interval $T_1$. The embedding layer 310 may generate a vector representation of the first set of values $S_1$ (e.g., the first vector $v_1$) while the first long short-term memory layer 320*a* may process the vector representation of the first set of values $S_1$. In some example embodiments, the first long short-term memory layer 320*a* may be configured to selectively retain and/or pass on information from processing the first set of values $S_1$. For instance, the first long short-term memory layer 320*a* may process the vector representation associated with the first set of values $S_1$ and determine whether to retain and/or pass on at least a portion of the resulting information to a next processing stage at the first long short-term memory layer 320*a* (e.g., for the second set of values $S_2$) and/or to a next long short-term memory layer including, for example, the second long short-term memory layer 320*b*. As such, the first long short-term memory layer 320*a* may (or may not) utilize at least some of the information associated with the first set of values $S_1$ when the first long short-term memory layer 120 processes the next set of values (e.g., the second set of values $S_2$) in the series of performance metrics being processed by the long short-term memory neural network 300. Similarly, the second long short-term memory layer 320*a* may (or may not) apply further processing to at least some of the information from the processing of the first set of values $S_1$ by the first long short-term memory layer 320*a*.

Referring again to FIG. 3A, the first long short-term memory layer 320*a* may process the second set of values $S_2$ subsequent to processing the first set of values $S_1$. In doing so, the first long short-term memory layer 320*a* may selectively retain and/or pass on at least a portion of the resulting information to a next processing stage at the first long short-term memory layer 320*a* (e.g., for the subsequent third set of values $S_3$). In this manner, the first long short-term memory layer 320*a* may utilize information associated with the first set of values $S_1$ and/or the second set of values $S_2$ when the first long short-term memory layer 320*a* is processing the third set of values $S_3$.

In some example embodiments, the first long short-term memory layer 320*a* may further selectively pass on information from the processing of the second set of values $S_2$ to a next long short-term memory layer including, for example, the second long short-term memory layer 320*b*. As such, the second long short-term memory layer 320*b* may further process and aggregate information derived from the processing of the first set of values $S_1$ and/or the second set of values $S_2$.

The first long short-term memory layer 320*a* may apply one or more weights in processing each set of values. Similarly, the second long short-term memory layer 320*b* may also apply one or more weights in further processing and aggregating information from the first long short-term memory layer 320*a*. According to some example embodiments, training the long short-term memory neural network 300 may include using the long short-term memory neural network 300 to process training data includes values for performance metrics that are known to correspond to the presence of one or more upcoming anomalies such as, for example, a memory outage and/or the like. Training the long short-term memory neural network 300 may further include applying supervised learning and/or optimization techniques to adjust the weights to minimize an error or loss in the output 304 from the long short-term memory neural network 300.

Figure 3B:
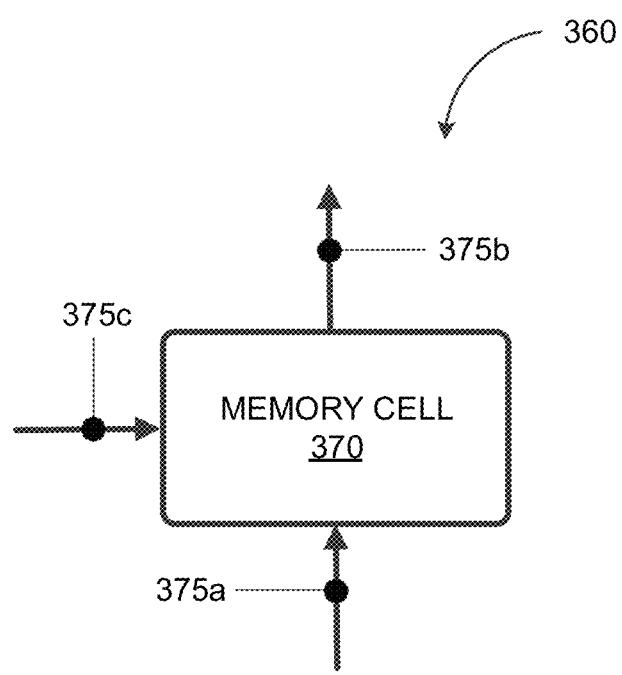
FIG. 3B depicts a long short-term memory block, in accordance with some example embodiments.

FIG. 3B depicts a long short-term memory block 360, in accordance with some example embodiments. The long short-term memory block 360 may be a component of a long short-term memory neural network. For example, the long short-term memory block 360 may implement the first long short-term memory layer 320*a* and/or the second long short-term memory layer 320*b* of the long short-term memory neural network 300. As shown in FIG. 3B, the long short-term memory block 360 may include a memory cell 370 coupled with an input gate 375*a*, an output gate 375*b*, and a forget gate 375*c*.

In some example embodiments, a state c of the long short-term memory block 360 may be controlled by the input 375*a*, the output 375*b*, and/or the forget 375*c*. The long short-term memory block 360 may further be associated with a hidden state h, which has a value corresponding to the one or more tokens encountered by the long short-term memory block 360. The value of the hidden state h may be carried forward as the long short-term memory block 360 continues to process subsequent tokens. Thus, the hidden state h may provide the memory associated with the long short-term memory block. Meanwhile, the input 375*a*, the output 375*b*, and/or the forget 375*c* may each apply an activation function, such as a hard sigmoid function and/or other type of function, to determine a portion of information that should be added to, removed, and/or output from the memory cell 370.

For example, the memory cell 370 may receive, at a time interval t, a set of values $S_t$. The forget 375*c* may determine whether to remove at least a portion of a value of the state c of the memory cell 370 by applying the activation function a to the set of values $S_t$ and the value of the previous hidden state $h_{t-1}$. The memory cell 370 may have retained the value of the hidden state $h_{t-1}$ when the long short-term memory block 360 processed a previous set of values $S_{t-1}$ received at an earlier time interval t−1. It should be appreciated that the value of the hidden state $h_{t-1}$ may correspond to a plurality of sets of values from 1 to t−1 that have been processed by the long short-term memory block 360. A portion of information $f_t$ that may be removed from the state c of the memory cell 370 at time t may be given by Equation (2) below:

$$f_t = \sigma(x_f + h_{t-1} \bullet U_f) \qquad (2)$$

wherein $x_f = _t\blacksquare W_f + b_f$, wherein ● may denote an inner product, and wherein $U_f$, $W_f$, and $b_f$ may denote the weights that are applied at the forget 375c.

Meanwhile, the input 375a may determine whether to store at least a portion of the current input, for example, the set or values $S_t$, in the memory cell 370 by applying the activation function a to the set of values $S_t$ and the value of the hidden state $h_{t-1}$. Storing at least a portion of the current input (e.g., the set of values $S_t$) may alter the value of the state c of the long short-term memory block 360. A portion of the information $i_t$ that may be stored to the memory cell 370 may be determined by applying Equation (3) below:

$$i_t = \sigma(x_i + h_{t-1} \bullet U_i) \qquad (3)$$

wherein $x_i = x_t \blacksquare W_i + b_i$, wherein ● may denote an inner product, and wherein $U_i$, $W_i$, and $b_i$ may denote the weights applied at the input 375a.

The output 375b may determine a portion of the hidden state $h_{t-1}$ that should be output by the long short-term memory block 360. In some example embodiments, the output 375b may determine the portion of the hidden state $h_{t-1}$ to output by applying the activation function σ to the set of values $S_t$ and the value of the hidden state $h_{t-1}$. In some example embodiments, an output $o_t$ of the long short-term memory block 360 at time t may be determined by applying Equation (4) below:

$$O_t = \sigma(x_o + h_{t-1} \bullet U_o) \qquad (4)$$

wherein $x_o = x_t \blacksquare W_o + b_o$, wherein ● may denote an inner product, and wherein $U_o$, $W_o$, and $b_o$ may denote the weights applied at the output 375b.

In some example embodiments, the addition and/or removal of information from the memory cell 370 may alter the state c of the long short-term memory block 360. The state $c_t$ of the long short-term memory block 360 at time t may be given by the following Equation (5):

$$c_t = f_t \odot c_{t-1} + i \odot \eta(x_c + h_{t-1} \bullet U_c) \qquad (5)$$

wherein $x_c = x_t \blacksquare W_c + b_c$, wherein η may denote a activation function (e.g., hyperbolic tangent function (tanh)), wherein ● may denote an inner product, wherein ⊙ may denote elementwise multiplication, and wherein $U_c$, $W_c$, and $b_c$ may denote the weights applied to determine the state c of the long short-term memory block 360.

In some example embodiments, the additional and/or removal of information from the memory cell 370 may change the hidden state h stored in the memory cell 370. It should be appreciated that the long short-term memory block 360 may output the hidden state $h_t$ at time t. For instance, the first long short-term memory layer 320a may output, to the second long short-term memory layer 320b, the hidden state $h_t$ of the long short-term memory block 360. The hidden state $h_t$ stored in the memory cell 370 at time t may be given by the following Equation (6):

$$h_t = o_t \odot \eta(c_t) \qquad (6)$$

wherein $o_t$ may denote the output of from the long short-term memory block 360 at time t, wherein $c_t$ may denote the state of the long short-term memory block 360 at time t, wherein ⊙ may denote elementwise multiplication, and wherein η may denote an activation function (e.g., hyperbolic tangent function (tanh)).

Figure 4:
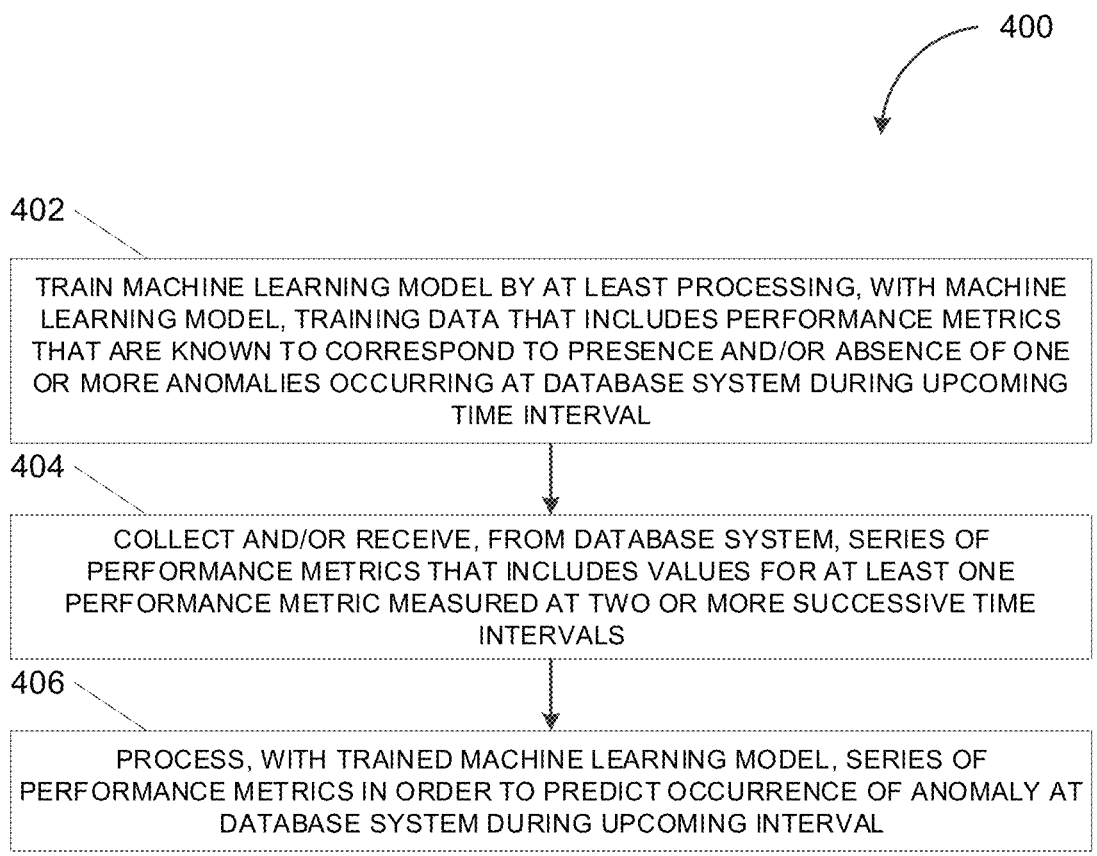
FIG. 4 depicts a flowchart illustrating a process for predicting the occurrence of one or more anomalies in a database system, in accordance with some example embodiments.

FIG. 4 depicts a flowchart illustrating a process 400 for predicting the occurrence of one or more anomalies in a database system, in accordance with some example embodiments. Referring to FIGS. 1-2, 3A-B, and 4, the process 400 may be performed by the anomaly prediction engine 110. For instance, in some example embodiments, the anomaly prediction engine 110 may perform the process 400 in order to predict, based on a series of performance metrics received and/or collected from the database system 140, the occurrence of an anomaly (e.g., a memory outage and/or the like) at the database system 400 during an upcoming time interval (e.g., within the next x quantity of time).

At 402, the anomaly prediction engine 110 may train the machine learning model 115 by at least processing, with the machine learning model 115, training data that includes performance metrics that are known to correspond to the presence and/or absence of one or more anomalies occurring at the database system 140 during an upcoming time interval. For example, the anomaly prediction engine 110 may train the machine learning model 115 by at least processing, with the machine learning model 115, training data that includes one or more sets of values for different performance metrics. The one or more sets of values may include values that are received and/or collected from the database system 140 (and/or a different database system) when the database system 140 is operating without encountering any anomalies. Alternatively and/or additionally, the one or more sets of values may include values that are received and/or collected from the database system 140 (and/or a different database system) a certain quantity of time (e.g., 60 minutes or a different quantity of time) prior to the occurrence of an anomaly such as, for example, a memory outage and/or the like.

At 404, the anomaly prediction engine 110 may collect and/or receive, from the database system 140, a series of performance metrics that includes values for at least one performance metric measured at two or more successive time intervals. As noted, the series of one or more performance metrics collected and/or received from the database system 140 may include any performance metric that may be indicative of an operational state of the database system including, for example, an average quantity of host resident memory, an average quantity of host memory used, a quantity of column store unloads, an average ping length, a count of out of memory events in index server trace file, an average size of host swap, and/or the like. Moreover, the series of one or more performance metrics may include, for example, at least one performance metric received and/or collected from the database system at successive time intervals including, for example, a first time interval, a second time interval, a third time interval, and/or the like.

For example, at each of the time intervals T0, T1, T2, T3, T4, and T5, the anomaly prediction engine 110 may receive and/or collect, from the database system 140, a set of values for each of the six performance metrics M1, M2, M3, M4, M5, and M6. That is, at the first time interval T0, the anomaly prediction engine 110 may receive and/or collect, from the database system 140, a first set of values $S_1$ for the six performance metrics M1, M2, M3, M4, M5, and M6 that includes the values $v_{1.0}$, $v_{2.0}$, $v_{3.0}$, $v_{4.0}$, $v_{5.0}$, and $v_{6.0}$. At the second time interval T2, the anomaly prediction engine 110 may receive and/or collect from the database system 140, a second set of values $S_2$ for the six performance metrics M1, M2, M3, M4, M5, and M6 that includes the values $v_{1.1}$, $v_{2.1}$, $v_{3.1}$, $v_{4.1}$, $v_{5.1}$, and $v_{6.1}$. The anomaly prediction engine 110 may receive additional sets of values including, for example, $S_3$, $S_4$, $S_5$, and $S_6$ for the six performance metrics M1, M2, M3, M4, M5, and M6 during the subsequent time intervals T2, T3, T4, T5, and/or the like.

At 406, the anomaly prediction engine 110 may process, with the trained machine-learning model 115, the series of performance metrics in order to predict the occurrence of an anomaly at the database system 140 during an upcoming time interval. In some example embodiments, the machine learning model 115 may be trained to identify a sequence of one or more performance metrics indicative of the occurrence of one or more anomalies such as, for example, a memory outage and/or the like, during an upcoming time interval. As noted, the machine learning model 115 may be a long short-term memory (LSTM) neural network. Accordingly, the trained machine learning model 115 may be able to recognize dependencies amongst the performance metrics that are collected and/or received at multiple successive time intervals. In doing so, the trained machine learning model 115 may detect when the machine learning model 115 has encountered a sequence of performance metrics that is indicative of the occurrence of an anomaly (e.g., a memory outage and/or the like) at the database system 140 during an upcoming time interval. For example, as shown in FIG. 3, the trained machine learning model 115 may detect when the performance metrics received and/or collected from the database system 140 begin to exhibit uncharacteristic values an x quantity of time prior to the occurrence of the corresponding anomaly. Thus, the trained machine-learning model 115 may be capable of predicting, an x quantity of time in advance, the occurrence of the anomaly at the database system 140.

Figure 5:
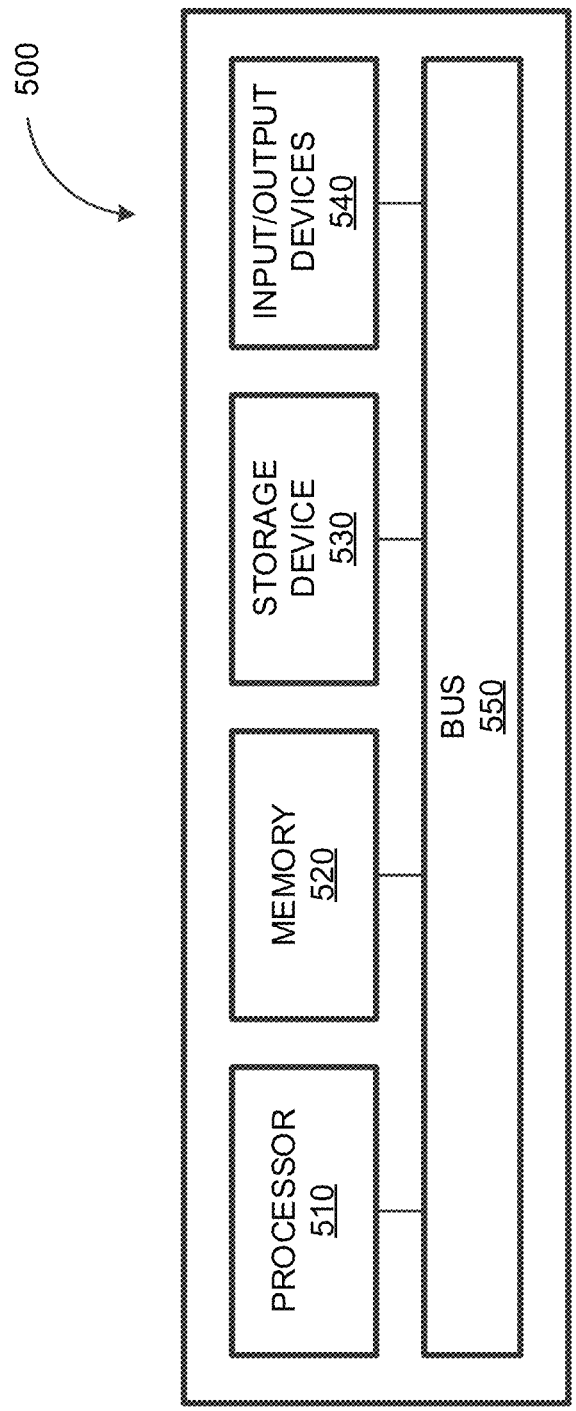
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the anomaly prediction engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the recommendation engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   training a machine learning model to predict an occurrence of an anomaly at a database system during an upcoming time interval, the anomaly comprising a memory outage in which a memory fails to accommodate data being loaded from the database system to respond to one or more queries, the machine learning model comprising a plurality of layers comprising an embedding layer, a long short-term memory layer, a dropout layer, and an activation layer;
   receiving, from the database system, a series of performance metrics, the series of the performance metrics comprising values for at least one performance metric measured at two or more successive time intervals, the at least one performance metric being indicative of an operational state of the database system;
   determining dependencies amongst uncharacteristic values occurring in the series of the performance metrics across the two or more successive time intervals; and
   processing, using the machine learning model, the series of the performance metrics to predict the occurrence of the anomaly at the database system during the upcoming time interval based on the dependencies amongst the uncharacteristic values occurring in the series of the performance metrics across the two or more successive time intervals by encoding, using the embedding layer, the series of the performance metrics, to generate a sequence of vector representations that are processed by the long short-term memory layer to determine interdependencies amongst the series of the performance metrics filtered by the dropout layer and processed by the activation layer applying an activation function to generate a sequence of performance metrics identified as being normal or anomalous, the sequence of performance metrics being indicative of a prediction of the occurrence of the anomaly comprising the memory outage at the database system.

2. The system of claim 1, wherein the memory comprises a random access memory of the database system.

3. The system of claim 1, wherein the series of the performance metrics comprise an average quantity of host resident memory, an average quantity of host memory used, a quantity of column store unloads, an average ping length, a count of out of memory events in index server trace file, and/or an average size of host swap.

4. The system of claim 1, wherein the training of the machine learning model comprises processing, with the machine learning model, training data, and wherein the training data comprises a plurality of performance metrics that are known to correspond to the anomaly occurring at the database system during the upcoming time interval.

5. The system of claim 4, wherein the training data comprises a first set of values for a first time interval, and wherein the training data further comprises a second set of values for a second time interval.

6. The system of claim 1, wherein the machine learning model comprises a long short-term memory neural network.

7. The system of claim 6, wherein the long short-term memory neural network predicts the occurrence of the anomaly at the database system during the upcoming time interval by at least detecting a sequence of values for the series of the performance metrics that correspond to the anomaly occurring at the database system during the upcoming time interval.

8. The system of claim 6, wherein the long short-term memory neural network is trained by at least adjusting one or more weights applied by the long short-term memory neural network, and wherein the one or more weights are adjusted to at least minimize an error in an output of the long short-term memory neural network.

9. The system of claim 6, wherein the long short-term memory neural network comprises at least one long short-term memory layer comprising a memory cell, and wherein the processing of the series of the performance metrics updates a hidden state of memory cell.

10. The system of claim 6, wherein the long short-term memory neural network comprises a first long short-term memory layer and a second long short-term memory layer, and wherein the second long short-term memory layer further processes an output from the first long short-term memory layer.

11. A computer-implemented method, comprising:
training a machine learning model to predict an occurrence of an anomaly at a database system during an upcoming time interval, the anomaly comprising a memory outage in which a memory fails to accommodate data being loaded from the database system to respond to one or more queries, the machine learning model comprising a plurality of layers comprising an embedding layer, a long short-term memory layer, a dropout layer, and an activation layer;
receiving, from the database system, a series of performance metrics, the series of the performance metrics comprising values for at least one performance metric measured at two or more successive time intervals, the at least one performance metric being indicative of an operational state of the database system;
determining dependencies amongst uncharacteristic values occurring in the series of the performance metrics across the two or more successive time intervals; and
processing, using the machine learning model, the series of the performance metrics to predict the occurrence of the anomaly at the database system during the upcoming time interval based on the dependencies amongst the uncharacteristic values occurring in the series of the performance metrics across the two or more successive time intervals by encoding, using the embedding layer, the series of the performance metrics, to generate a sequence of vector representations that are processed by the long short-term memory layer to determine interdependencies amongst the series of the performance metrics filtered by the dropout layer and processed by the activation layer applying an activation function to generate a sequence of performance metrics identified as being normal or anomalous, the sequence of performance metrics being indicative of a prediction of the occurrence of the anomaly comprising the memory outage at the database system.

12. The computer-implemented method of claim 11, wherein the memory comprises a random access memory of the database system.

13. The computer-implemented method of claim 11, wherein the series of the performance metrics comprise an average quantity of host resident memory, an average quantity of host memory used, a quantity of column store unloads, an average ping length, a count of out of memory events in index server trace file, and/or an average size of host swap.

14. The computer-implemented method of claim 11, wherein the training of the machine learning model comprises processing, with the machine learning model, training data, and wherein the training data comprises a plurality of performance metrics that are known to correspond to the anomaly occurring at the database system during the upcoming time interval.

15. The computer-implemented method of claim 14, wherein the training data comprises a first set of values for a first time interval, and wherein the training data further comprises a second set of values for a second time interval.

16. The computer-implemented method of claim 11, wherein the machine learning model comprises a long short-term memory neural network, and wherein the long short-term memory neural network predicts the occurrence of the anomaly at the database system during the upcoming time interval by at least detecting a sequence of values for the series of the performance metrics that correspond to the anomaly occurring at the database system during the upcoming time interval.

17. The computer-implemented method of claim 16, wherein the long short-term memory neural network is trained by at least adjusting one or more weights applied by the long short-term memory neural network, and wherein the one or more weights are adjusted to at least minimize an error in an output of the long short-term memory neural network.

18. The computer-implemented method of claim 16, wherein the long short-term memory neural network comprises at least one long short-term memory layer comprising a memory cell, and wherein the processing of the series of the performance metrics updates a hidden state of memory cell.

19. The computer-implemented method of claim 16, wherein the long short-term memory neural network comprises a first long short-term memory layer and a second long short-term memory layer, and wherein the second long short-term memory layer further processes an output from the first long short-term memory layer.

20. A non-transitory computer readable medium storing instructions, which when executed by at least one data processor, result in operations comprising:
training a machine learning model to predict an occurrence of an anomaly at a database system during an upcoming time interval, the anomaly comprising a memory outage in which a memory fails to accommodate data being loaded from the database system to respond to one or more queries, the machine learning model comprising a plurality of layers comprising an embedding layer, a long short-term memory layer, a dropout layer, and an activation layer;
receiving, from the database system, a series of performance metrics, the series of the performance metrics comprising values for at least one performance metric measured at two or more successive time intervals, the at least one performance metric being indicative of an operational state of the database system;
determining dependencies amongst uncharacteristic values occurring in the series of the performance metrics across the two or more successive time intervals; and
processing, using the machine learning model, the series of the performance metrics to predict the occurrence of the anomaly at the database system during the upcoming time interval based on the dependencies amongst the uncharacteristic values occurring in the series of the performance metrics across the two or more successive time intervals by encoding, using the embedding layer, the series of the performance metrics, to generate a sequence of vector representations that are processed by the long short-term memory layer to determine interdependencies amongst the series of the performance metrics filtered by the dropout layer and processed by the activation layer applying an activation function to generate a sequence of performance metrics identified as being normal or anomalous, the sequence of performance metrics being indicative of a prediction of the occurrence of the anomaly comprising the memory outage at the database system.

* * * * *